United States Patent [19]
Thompson

[11] 3,888,894
[45] June 10, 1975

[54] TERTIARY DIAMIDES

[75] Inventor: Robert M. Thompson, Chalfonte, Del.

[73] Assignee: Sun Research and Development Co., Philadelphia, Pa.

[22] Filed: Oct. 2, 1972

[21] Appl. No.: 293,979

[52] U.S. Cl............. 260/404.5; 252/73; 260/29.1; 260/561 R
[51] Int. Cl......................................... C07c 103/00
[58] Field of Search .................... 260/404.5, 561 R

[56] References Cited
UNITED STATES PATENTS

| | | | |
|---|---|---|---|
| 2,132,388 | 10/1938 | Berchet................. | 260/404.5 X |
| 2,632,023 | 3/1953 | Bortnick................. | 260/561 R |
| 3,262,913 | 7/1966 | Chiba et al............. | 260/561 R |
| 3,539,629 | 11/1970 | Mackellar................ | 260/561 R |

FOREIGN PATENTS OR APPLICATIONS

| 903,200 | 8/1962 | United Kingdom............ | 260/561 R |
|---|---|---|---|

OTHER PUBLICATIONS
DeCoste, Chem. Abstracts, 72:13299r.

*Primary Examiner*—Lewis Gotts
*Assistant Examiner*—Ethel G. Love
*Attorney, Agent, or Firm*—George L. Church; J. Edward Hess; Anthony Potts, Jr.

[57] ABSTRACT

This invention relates to novel liquid tertiary diamides having the following structural formula:

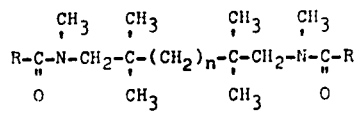

wherein
$n = 0{-}10$
$R = -(CH_2)_m-CH_3$
wherein
$m = 4{-}12$

One such diamide is N,N'-2,2,5,5-tetramethylhexamethylene-N,N'-dimethylpelargonamide. The diamides have utility as heat transfer fluids and plasticizers.

3 Claims, No Drawings

TERTIARY DIAMIDES

CROSS-REFERENCES TO RELATED APPLICATIONS

This invention is related to those described in the following listed applications:

| Serial Numbers | Inventors |
|---|---|
| 293,980 | R. M. Thompson |
| 293,981 | R. M. Thompson |
| 293,982 | R. M. Thompson |
| 293,984 | R. M. Thompson and F. E. Didot |
| 293,983 | R. M. Thompson and A. F. Talbot |

All of the aforementioned applications filed the same date as this application. The first of the aforementioned applications relates to another class of diamides; the second and third relate to the use of certain diamides as lubricants; the fourth to the use of certain diamides as swelling agents and the last one to the use of certain diamides as a component of greases.

SUMMARY OF THE INVENTION

This invention pertains to novel tertiary diamides having the following structural formula:

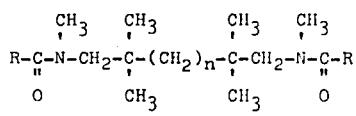

wherein
$n = 0-10$
$R = -(CH_2)_m-CH_3$
wherein
$m = 4-12$

One such diamide is N,N-2,2,5,5-tetramethylhexamethylene-N,N-dimethylpelargonamide. The diamides have utility as heat transfer fluids and plasticizers.

DESCRIPTION OF THE INVENTION

The novel tertiary diamides of this invention can be prepared by the methylation of a sodium salt of a suitable diamide by using, for example, methyliodide. This general reaction is illustrated by the following equation:

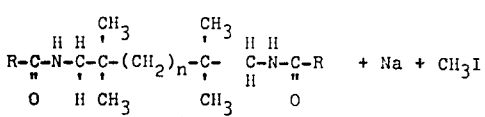

(1)

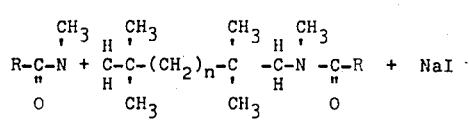

Other bases besides sodium can be used and other methylhalides besides methyliodide can be used. The R appearing in equation (1) equals $-(CH_2)_m-CH_3$ whereas $m = 4-12$, preferably, 5-10 and the $n$ equals 0-10, preferably, 1-8.

Precursors of the suitable diamide of equation (1) can be prepared by reacting suitable diamines with saturated aliphatic monoacids. This general reaction is illustrated by the following equation:

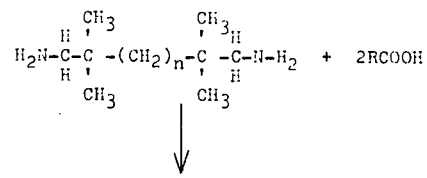

(2)

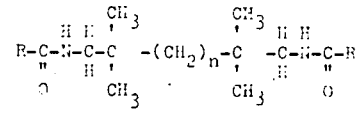

The R of the saturated aliphatic nonacid of equation 1 equals $-(CH_2)_m-CH_3$ wherein $m = 4-12$, preferably, 5-10 while the $n$ of the diamine equals 0-10, preferably, 1-8.

Precursors of the suitable diamines of equation (2) can be prepared by hydrogenating a suitable nitrile. A suitable nitrile is a paraffinic aliphatic material having two methyl radicals attached to each of the two $\beta$ carbons. This general reaction is illustrated by the following equation:

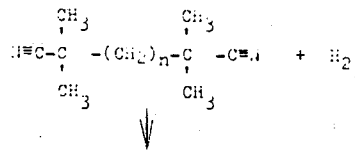

(3)

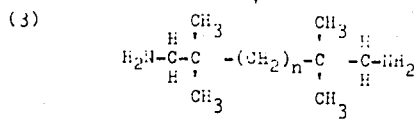

The $n$ of the nitrile of equation (3) equals 0-10, preferably, 1-8.

The precursors of the nitriles of equation (3) can be prepared by interaction of a suitable paraffinic dihalide with sodium or potassium cyanide in aqueous-alcoholic solution, thus (4) $XR'X + 2KCN \rightarrow N \equiv CR'C \equiv N + 2KX$ The R' of the paraffinic halide equals

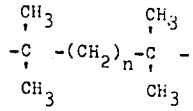

wherein $n$ equals 0-10, preferably, 1-8.

Particular nitriles can be prepared by other methods than that shown by equation (4). For example, 2,2,5,5-tetramethylhexamethylene dinitrile can be prepared by the free radical coupling of pivalonitrile $((CH_3)_3C \equiv N)$.

The tertiary diamides of present invention have many properties which make them excellent heat transfer media. Among these properties are that they are generally innocuous towards metals, have relatively good thermal stability, have high boiling points and are liquid at ambient temperature. A comprehensive discussion of heat-transfer media other than water is given in Kirk-Othmer, ENCYCLOPEDIA OF CHEMICAL TECHNOLOGY, second Edition, Volume 10. Also, because of their high boiling points the tetiary diamines have utility as a plasticizer. The latter is generally an organic compound added to some solid polymers both to facilitate processing and to increase the flexibility and toughness of the final product by internal modification of the polymer molecule.

Following is an example of how a tertiary diamide of present invention was prepared; also reported is its physical properties.

EXAMPLE a. Preparation of the dinitrile

One gram mole of pivalonitrile ($(CH_3)_3C-C \equiv N$) and 1,300 milliliters of water were charged to a reaction vessel. While the contents of the vessel were agitated, 150 milliliters of 6.67 molar hydrogen peroxide solution and 750 milliliters of 1.33 molar ferrous sulfate solution were added simultaneously and equivalently from calibrated burets. The ferrous sulfate solution was prepared from 278 grams of ferrous sulfate heptahydrate, 55 milliliters of sulfuric acid and 575 milliliters of water. During the simultaneous addition, which required some 15 minutes, the agitated mixture was maintained at a temperature of 30°C. by means of an ice-bath. Afterwards, the solid dinitrile was removed from the mixture by filtration. The removed solid dinitrile was water washed and dried. The dried dinitrile was recrystallized from 180 milliliters of ethyl alcohol. The recrystallized $\alpha,\alpha,\alpha',\alpha'$-tetramethyladiponitrile had a melting point of 137°-138°C.

b. Preparation of the diamine 50 grams of the aforementioned dinitrile were charged to a 1 liter bomb along with 500 milliliters of methanol and 5 grams of Raney nickel. Also, the bomb was pressurized with hydrogen to a pressure of 1,200 psig. The bomb with its contents was heated to a temperature of 60°C. and rocked for 8.5 hours. Then, after the temperature of the bomb reached ambient temperature, the bomb was opened and the reaction mixture remmoved. The latter was filtered to remove the Raney nickel and subsequently, the methanol evaporated. The remaining viscous oil was distilled. Its boiling point was 60°C. at 4mm Hg. The measured nitrogen content of the 2,2,5,5-tetramethylhexamethylene diamine was 15.9 weight percent compared to 16.3 weight percent calculated for $C_{16}H_{24}N_2$.

c. Preparation of the pelargonamide 0.116 moles (20 grams) of the previously mentioned diamine and 0.116 moles (36.8 grams) of pelargonic acid ($CH_3(CH_2)_7COOH$) were charged to a 200 milliliter, three-neck flask equipped with a magnetic stirring bar, thermometer and Dean Stark trap and condenser. The resulting mixture in the flask was heated to a temperature of 180°-190°C., with stirring, and maintained at that temperature until no more water, a reaction product, came over into the Dean Stark trap.

Afterwards, the heating was stopped, the flask and its contents were allowed to cool. After cooling, 150 milliliters of ether were added to the contents in the flask, and then the ether solution was first washed with a dilute HCl solution, then washed with a 5 percent aqueous $Na_2CO_3$ solution and finally washed with just water. Any water in the ether solution was removed by contacting the solution with $MgSO_4$. Afterwards the ether was removed by application of a vacuum. The resulting white solid pelargonamide, 45 grams, had a melting point of 77°-79°C.

d. Methylation of the pelargonamide 800 milliliters of sodium dried xylene were charged to a 2 liter reaction flask equipped with stirrer, reflux condenser and nitrogen inlet. The xylene had been just recently distilled to remove impurities. Also, to the reaction flask were charged 3.5 grams of sodium and 33 grams of the aforementioned pelargonamide. The resulting mixture in the flask was agitated and refluxed overnight under a nitrogen atmosphere.

After refluxing overnight, the three component mixture was transferred under nitrogen to a dry one liter flask equipped with a cold finger condenser, magnetic stirrer and nitrogen inlet. The cold finger condenser contained a dry ice-acetone mixture. The flask was heated to a temperature of 40°C. and while maintained at that temperature, 17.7 grams of methyl iodide were added to the agitated mixture dropwise. The dropwise addition was completed in an hour, but the agitation at room temperature, continued for about 20 hours. The flask and its contents were allowed to cool; afterwards the mixture was filtered to remove the precipitated sodium iodide. The filtered solution was water washed and the xylene solvent removed by distillation. Infrared examination of the resulting 25 grams of liquid indicated the presence of NH bands and therefore, that the reaction was incomplete.

The aforementioned procedure for the methylation of the pelargonamide (step d) was repeated. After this second treatment, the amide liquid, as indicated by infrared examination, was free of NH bands. The color of the resulting N,N'-dimethyl-2,2,5,5-tetramethylhexamethylene-N,N'-dimethylpelargonamide was slightly yellow. The yellow tint was believed to be from trace impurities.

The invention claimed is:

1. 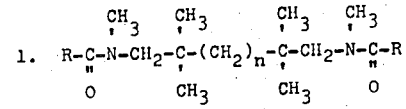

wherein
$n = 0-10$
$R = -(CH_2)_m-CH_3$
wherein
$m = 4-12$.

2. Compound according to claim 1 wherein $n = 1-8$ and $m = 5-10$.

3. Compound according to claim 2 wherein the diamide is N,N'-2,2,5,5-tetramethylhexamethylene-N,N'-dimethylpelargonamide.

* * * * *